May 22, 1956 W. R. HEDRICK 2,746,687
THREADLESS BOLT RAIL JOINT
Filed Dec. 29, 1952 2 Sheets-Sheet 1
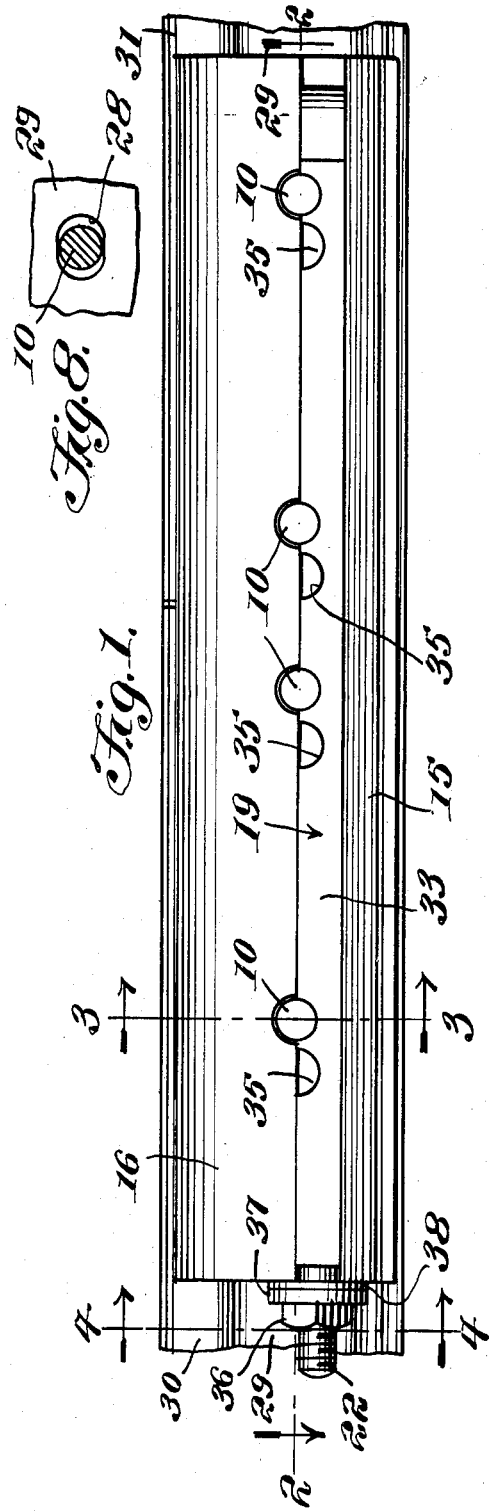
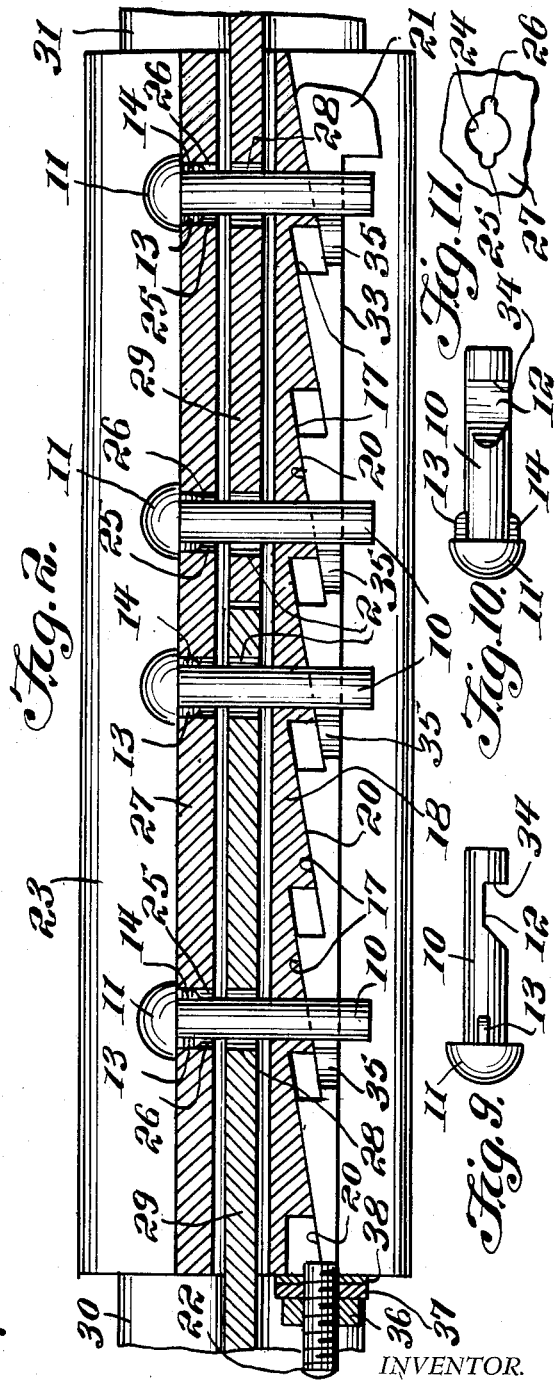
INVENTOR.
William R. Hedrick,
BY Victor J. Evans & Co.
ATTORNEYS

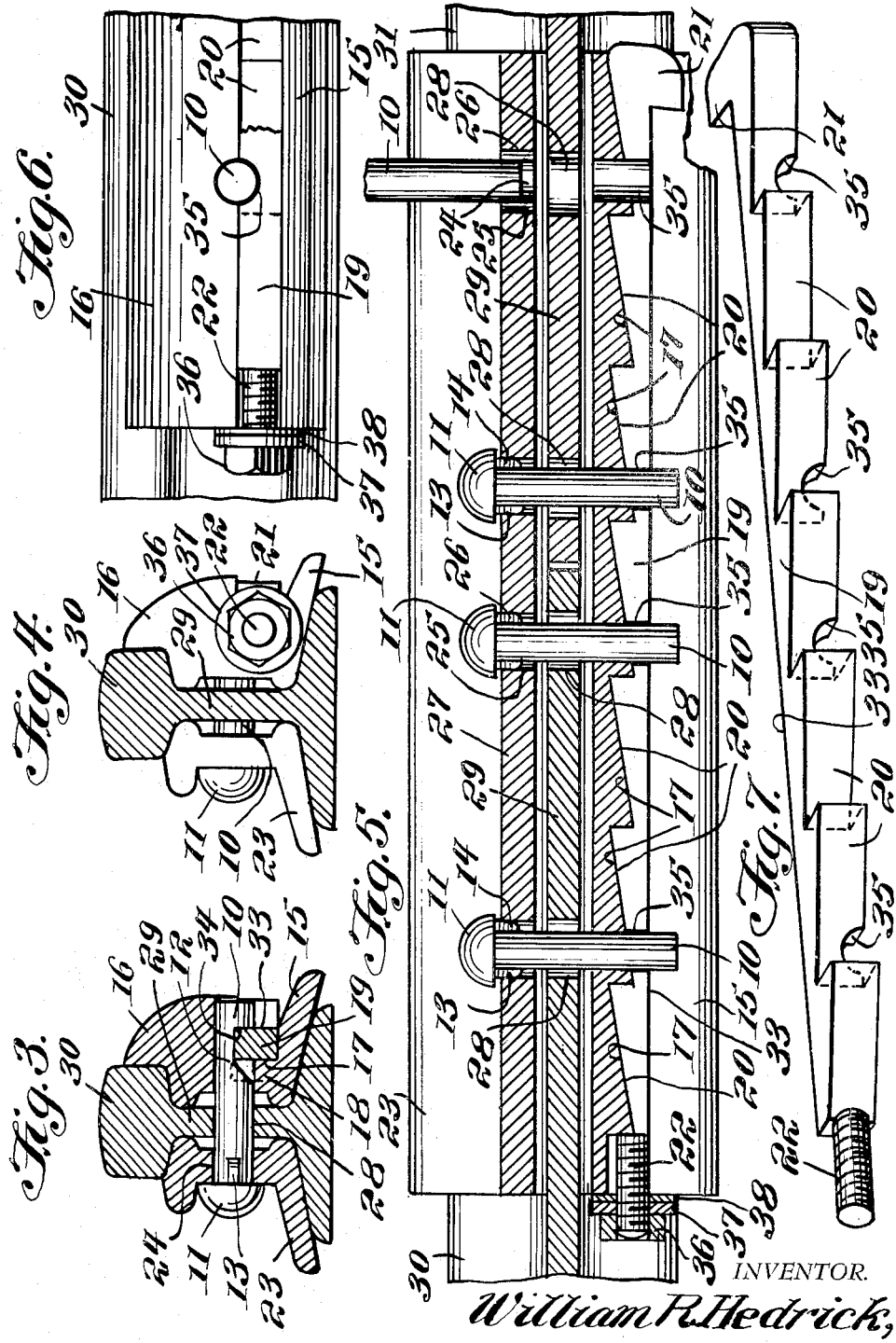

ered by flanges of wheels jumping rails whereas in the patent the corresponding parts are exposed and are subject to be sheared by wheel flanges.

United States Patent Office 2,746,687
Patented May 22, 1956

2,746,687

THREADLESS BOLT RAIL JOINT

William R. Hedrick, Knoxville, Tenn.

Application December 29, 1952, Serial No. 328,367

1 Claim. (Cl. 238—252)

This invention relates to rail joints of the type in which the ends of railroad rails are clamped together with bolts extended through openings in webs of the rails and also through splice bars overlapping the ends of the rails and in particular a joint in which threadless bolts are used and wherein the bolts are secured in clamping relation with the splice bars and rails with a wedge bar having inclined surfaces positioned to coact with inclined surfaces of one of the splice bars and wherein the wedge bar extends into notches in the sides of the bolts.

The purpose of this invention is to eliminate the necessity of individually tightening up each bolt of a rail joint and also to provide a rail joint in which it is substantially impossible for bolts thereof to work loose.

With the conventional rail joint the continuous pounding of wheels or heavy locomotives and train units causes wear to develop between webs of the rails and the bolts and as the wheels approach the joints the ends of the rails bend downwardly resulting in the wheels stricking the rails ahead of the joints and thereby driving the rails forwardly. This continuous driving action, particularly where trains travel in one direction only on a track, causes the track to travel in the direction of travel of a train and, where rails are secured to elements of a bridge, one end of the bridge has a tendency to leave the supporting pier.

With this thought in mind this invention contemplates a continuous wedge bar for locking all bolts of a rail joint whereby splice bars of the joint are rigidly held against coacting rail surfaces and bending in the joint is substantially eliminated.

The rail joint of this invention is an improvement over the rail joint of my prior Patent No. 1,256,227 of February 12, 1918, in that the two separate bars used on the ends of the bolts are replaced with a single wedge bar and coacting wedge or inclined surfaces are provided on the inner surface of the splice bar. Another improvement is in the fact that the ends of the bolts are covered to protect the bolts and bars against being sheared by flanges of wheels jumping rails whereas in the patent the corresponding parts are exposed and are subject to be sheared by wheel flanges.

The object of this invention is, therefore, to provide a rail joint wherein bolts connecting splice bars to ends of rails are rigidly held in position with a wedge bar and wherein the bar and the extended ends of the bolts are protected by a continuous ledge provided on the upper edge of the splice bar through which the ends of the bolts extend.

Another object of the invention is to provide an improved rail joint wherein bolts of the joints are rigidly clamped in locking positions with a wedge bar wherein the bolts are duplicates, each being of the same size and length.

A further object of the invention is to provide an improved rail joint whereby ends of rails are permanently held to prevent bending in the joint and in which the joint is of a comparatively simple and economical construction.

With these and other objects and advantages in view the invention embodies a rail joint having splice bars secured against the sides of abutting ends of rails with bolts having notches in the under surfaces thereof extended through the splice bars and webs of the rails and with a wedge bar, the outer surface of which is parallel to the webs of the rails, and which is provided with inclined surfaces positioned to coact with corresponding surfaces of the splice bar whereby with the outer surface of the wedge bar positioned in the notches of the bolts the bolts are rigidly clamped in locking positions.

Other features and advantages of the invention will appear from the following description taken in connection with the drawings, wherein:

Figure 1 is a side elevational view looking toward the inner side of a railroad rail with ends of two rails secured together by the improved rail joint.

Figure 2 is a sectional plan through the rail joint taken on line 2—2 of Figure 1.

Figure 3 is a cross section through the rail joint taken on line 3—3 of Figure 1.

Figure 4 is a cross section through one of the rails taken on line 4—4 of Figure 1 and taken at a point spaced from the ends of the splice bars whereby the ends of the splice bars are shown in elevation.

Figure 5 is a sectional plan through the rail joint, similar to the section shown in Figure 2, except that wedge bar is in a free position.

Figure 6 is an elevational view showing one end of the inner splice bar, similar to the view shown in Figure 1, except that the wedge bar is in the free position.

Figure 7 is a detail illustrating the wedge bar.

Figure 8 is a detail showing an elongated slot in the rail web, and through which one of the bolts extends, the bolt being shown in section.

Figure 9 is a side elevational view showing one of the bolts and illustrating the position of the knobs therein.

Figure 10 is a detail looking upwardly toward the underside of one of the bolts.

Figure 11 is an elevational view showing the notches in the sides of the opening of the splice bar against which the heads of the bolts are positioned.

Referring now to the drawings wherein like reference characters denote corresponding parts the improved rail joint of this invention includes bolts 10 having heads 11 on one end, notches 12 in the lower surfaces and projections 13 and 14 on the sides and adjacent the heads, a splice bar 15 having a ledge 16 on the upper edge and inclined surfaces 17 on a web 18 connecting the ledge to the flange, and a wedge bar 19 having inclined surfaces 20 positioned to coact with the inclined surface 17 of the splice bar and having a head 21 at one end and a threaded stud 22 at the opposite end.

The rail joint of this invention also includes a conventional splice bar 23 having bolt holes 24 with notches 25 and 26 at the sides thereof in the web 27 and with this splice bar positioned against one side of the rail it is secured in position by the bolts in combination with the wedge bar and splice bar 15 on the opposite side of the rail.

To compensate for expansion and contraction in the rails openings 28 in webs 29 of rails 30 and 31 are elongated and with the splice bars 23 and 15 positioned against the sides of the ends of the rails the bolts 10 are inserted through the openings 24 of the splice bar 23, the openings 28 of the webs of the rails and also openings 32 of the web 18 of the spliced bar 15.

With the bolts extended through the openings, as illustrated in Figures 2 and 5 the wedge bar 19 is inserted with the outer face 33 in engagement with end surfaces 34 of the notches 12 of the bolts and with the parts assembled in this manner the head 21 of the wedge bar 19 is driven into the rail joint whereby the bolts are drawn through the spliced bars and webs of the rails with a gripping action rigidly securing the parts in position.

The upper surface of the wedge bar 19 is provided with recesses 35 which are positioned to receive the bolts in assembling the joint, as illustrated in Figure 5.

The wedge bar is also provided with a nut 36 and lock washers 37 and 38 on the stud 22 for locking the wedge bar in the holding or clamping position whereby the bolts are permanently secured in the positions of rigidly holding the parts of the joint.

Should play develop in the joint the wedge bar 19 may be driven inwardly to take up all play and the bar may be secured in the adjusted position by the nut 36 and lock washers.

It will be understood that modifications, within the scope of the appended claim, may be made in the design and arrangement of the parts without departing from the spirit of the invention.

What is claimed is:

In a rail joint, the combination which comprises a conventional splice bar having a vertically disposed web extended from a flange and having spaced pin holes through said web, a clamping splice bar having a web with pin holes therethrough positioned to register with the pin holes of the web of the conventional splice bar having a ledge on the upper edge engaging the undersurface of the head of the rail and inclined surfaces thereon through which said pin holes extend, a plurality of pins each having a notch in its side adjacent one of its ends, a head on the opposite end of each of said pins, and a wedge bar having inclined surfaces thereon positioned to coact with the inclined surfaces of the clamping splice bar and positioned with one edge thereof extending through the notches of the pins whereby movement of the wedge bar in relation to the splice bar having the inclined surfaces thereon draws the pins into clamping relation with the splice bars and the webs of rails against which the splice bars are positioned, the ledge extended from the upper edge of said clamping splice bar being positioned to cover extended ends of pins positioned in the pin holes of the splice bars and also covering said wedge bar, and said wedge bar having a head on one end and a threaded stud with a nut and lock washers thereon extended from the opposite end, and semi-circular recesses in alternate inclined surfaces to engage the pins, said recesses engaging the pins during the assembly of the rail joint and said surfaces engaging the pins after assembly to prevent the rotation of said pins.

References Cited in the file of this patent
UNITED STATES PATENTS

| | | |
|---|---|---|
| 354,426 | Lewis et al. | Dec. 14, 1886 |
| 653,532 | Schimmel | July 10, 1900 |
| 795,941 | Smith | Aug. 1, 1905 |
| 879,878 | Kohn | Feb. 25, 1908 |
| 883,089 | Collier | Mar. 24, 1908 |
| 896,727 | Heber | Aug. 25, 1908 |
| 1,078,904 | Dorsey | Nov. 18, 1913 |
| 1,114,395 | Siwak | Oct. 20, 1914 |
| 1,146,496 | Healy | July 13, 1915 |
| 1,252,392 | Bull | Jan. 8, 1918 |
| 1,256,227 | Hedrick | Feb. 12, 1918 |
| 1,975,816 | Wolff | Oct. 9, 1934 |
| 2,041,828 | Greenwood | May 26, 1936 |